US 8,892,051 B2

(12) United States Patent
Yi et al.

(10) Patent No.: US 8,892,051 B2
(45) Date of Patent: Nov. 18, 2014

(54) TELEMATICS PROVISIONING SYSTEM FOR DEACTIVATED DEVICES

(75) Inventors: Ki Hak Yi, Windsor (CA); Sethu K. Madhavan, Erie, PA (US)

(73) Assignee: General Motors LLC, Detroit, MI (US)

( * ) Notice: Subject to any disclaimer, the term of this patent is extended or adjusted under 35 U.S.C. 154(b) by 657 days.

(21) Appl. No.: 13/072,087

(22) Filed: Mar. 25, 2011

(65) Prior Publication Data

US 2012/0244816 A1 Sep. 27, 2012

(51) Int. Cl.
*H04B 17/00* (2006.01)
*H04W 68/00* (2009.01)
*H04W 4/04* (2009.01)
*H04W 8/26* (2009.01)

(52) U.S. Cl.
CPC .............. *H04W 68/00* (2013.01); *H04W 4/046* (2013.01); *H04W 8/26* (2013.01)
USPC ..................... 455/67.11; 455/420; 455/404.1; 340/425.5

(58) Field of Classification Search
CPC ........ H04W 4/046; H04W 68/00; H04W 8/26
USPC ...................................... 455/67.11
See application file for complete search history.

(56) References Cited

U.S. PATENT DOCUMENTS

| | | | |
|---|---|---|---|
| 2003/0210675 A1* | 11/2003 | Chandnani et al. | 370/340 |
| 2006/0052092 A1* | 3/2006 | Schwinke et al. | 455/415 |
| 2006/0229090 A1* | 10/2006 | LaDue | 455/507 |
| 2007/0254639 A1* | 11/2007 | Chmielewski et al. | 455/419 |
| 2008/0143497 A1* | 6/2008 | Wasson et al. | 340/425.5 |
| 2009/0036091 A1* | 2/2009 | Ball et al. | 455/404.1 |
| 2009/0248236 A1* | 10/2009 | Schwinke | 701/33 |
| 2011/0059734 A1* | 3/2011 | Dunne et al. | 455/420 |

* cited by examiner

*Primary Examiner* — David Bilodeau
(74) *Attorney, Agent, or Firm* — Leydig, Voit & Mayer, Ltd.

(57) ABSTRACT

The disclosed invention provides a system and method for efficiently establishing a data call connection from a TSP call center to deactivated telematics units without a subscriber profile being in an HLR or VLR and without the use of a "500" number. An equipment identifier associated with a deactivated telematics unit may be delivered to the wireless network provider, and a calling line ID based on the equipment identifier and a common number for deactivated telematics units may be translated into a paging address through which the deactivated telematics unit may be paged. An appropriate paging strategy based on the network topology may be used to page the deactivated telematics unit and establish a data call connection with the deactivated telematics unit. The deactivated telematics unit may then be provisioned or perform or have performed on it other functions based on the data call connection.

20 Claims, 5 Drawing Sheets

TELEMATICS PROVISIONING SYSTEM FOR DEACTIVATED DEVICES

BACKGROUND OF THE INVENTION

Vehicle telematics systems are increasingly popular, and new telematics telematics units are put into service on an ongoing basis as new customer telematics units are activated. However, telematics units are also sometimes removed from service for various reasons. For example, a customer may no longer need telematics service, or may cease use of a certain telematics unit to begin use of another telematics unit.

Whatever the cause, the deactivation of telematics units can impede future actions with respect to such telematics units, e.g., reactivation, data gathering, shut down, and so on. For example, if a user has had a vehicle telematics module (hereinafter "telematics module") deactivated and then subsequently sells the vehicle, the new user may wish to reactivate the inactive module. Typically, this requires a complex sequence of steps that is a burden and cost on service providers. As another example, a service provider may wish to collect data, e.g., for statistical analysis or network problem solving, from a deactivated module, but this is typically a difficult task given that the telematics unit is deactivated. Similarly, a service provider may wish to completely shut down a telematics unit that has been deactivated but that is nonetheless causing network interference. Such a service provider may, however, have difficulty contacting and controlling the telematics unit due to its deactivated status.

Furthermore, conventional telematics units may use "500" numbers, which are often also referred to as "follow me" numbers, that provide a user with single number, e.g., (500) 123-4567, that is programmable to ring any one of a spectrum of possible destinations based on user location, time of day, etc. Thus, 500 numbers are nongeographically specific numbers. The use of such nongeographically specific numbers requires hardware manufacturers (or wireless carriers) to preprogram a 500 number in the network so that the telematics unit is recognized when used. Moreover, preprogramming telematics units in this way also imposes a shelf life on the telematics unit as a result of having a live number in the hardware. Finally, the use of preprogram med 500 numbers requires adherence to the NANPA (North American Numbering Plan Administration) number utilization policy for 500 Numbers.

Thus, it is an object underlying certain implementations of the described principles to provide a system that allows for a telematics service provider (TSP) to efficiently initiate a data call connection with a deactivated telematics unit for the provisioning of the deactivated telematics unit or other purposes without the use of "500" numbers. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for establishing a data call connection from a TSP call center to a deactivated telematics unit without a subscriber profile being in a home location register (HER) or visitor location register (VER.) and without the use of a "500" number. The data call connection may be utilized in provisioning the deactivated telematics units or for other purposes.

The mobile equipment identifier (MAID), electronic serial number (SEN.), or international mobile equipment identifier (IMIA) of a deactivated telematics unit may be delivered from the TSP call center to a cellular gateway or toll exchange of a wireless network IS UP (ISDN (Integrated Services Digital Network) User Part) extension utilizing SIS (Signaling System No. 7) over IP (Internet Protocol) signaling protocol or Soft switch signaling protocol and SIP (Session Initiation Protocol) over IP or UNUM (E.164 Number Mapping).

A common MIN (Mobile ID Number), MDN (Mobile Directory Number) or MSISDN, IMSI (Mobile Subscriber ISDN Number and International Mobile Subscriber Identity) may be assigned to multiple or all deactivated telematics units. A CLID (Calling Line ID) based on the MEID, ESN or IMEI of the deactivated telematics unit and the common MIN, MDN or MSISDN, IMSI associated with the deactivated telematics units may be translated into a paging address utilizing GTT (Global Title Translation) and paging address type utilizing IS41-MAP (US Telecoms Industry Association Interim Standard 41 Mobile Application Part) or GSM-MAP (Global System for Mobile Communications Mobile Application Part). The telematics unit may then be paged with a paging strategy based on the network topology. For example, different paging strategies may be implemented such as paging a MSC-wide (Mobile Switching Center) area, a NID-wide (Network Identifier) area or a SID-wide (System Identifier) area, or paging according to a Regional Global strategy, a Carrier Global strategy, or a Multiple Carrier Global strategy.

In a further implementation, billing control may be carried out under the common MIN, MDN or MSISDN, IMSI associated with the deactivated telematics units.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for establishing a data call connection from a TSP call center to a deactivated telematics unit without any subscriber profile being in a HLR or VLR.

Being able to reconnect with deactivated telematics units without requiring a subscriber profile in a HLR or VLR allows the service provider to quickly and easily reactivate a telematics module as it comes into a new customer's possession. It also allows the service provider to shut down troublesome telematics units that are causing network issues after being deactivated. It will be appreciated that a deactivated telematics module with no subscriber profile associated with it on the relevant HLR and VLR would normally be unreachable for further action or reactivation by the service provider. However, in an implementation of the described principles, a MEID, ESN or IMEI of a deactivated telematics unit may be delivered to the wireless network provider, and the CLID based on the MEID, ESN or IMEI and MIN, MDN or MSISDN, IMSI may be translated into a paging address through which the deactivated telematics unit may be paged. An appropriate paging strategy based on the network topology may be used to establish a data call connection with the deactivated telematics unit.

Given this overview, an exemplary environment in which the invention may operate is described hereinafter. It will be appreciated that the described environment is an example, and does not imply any limitation regarding the use of other environments to practice the invention.

Figure 1:
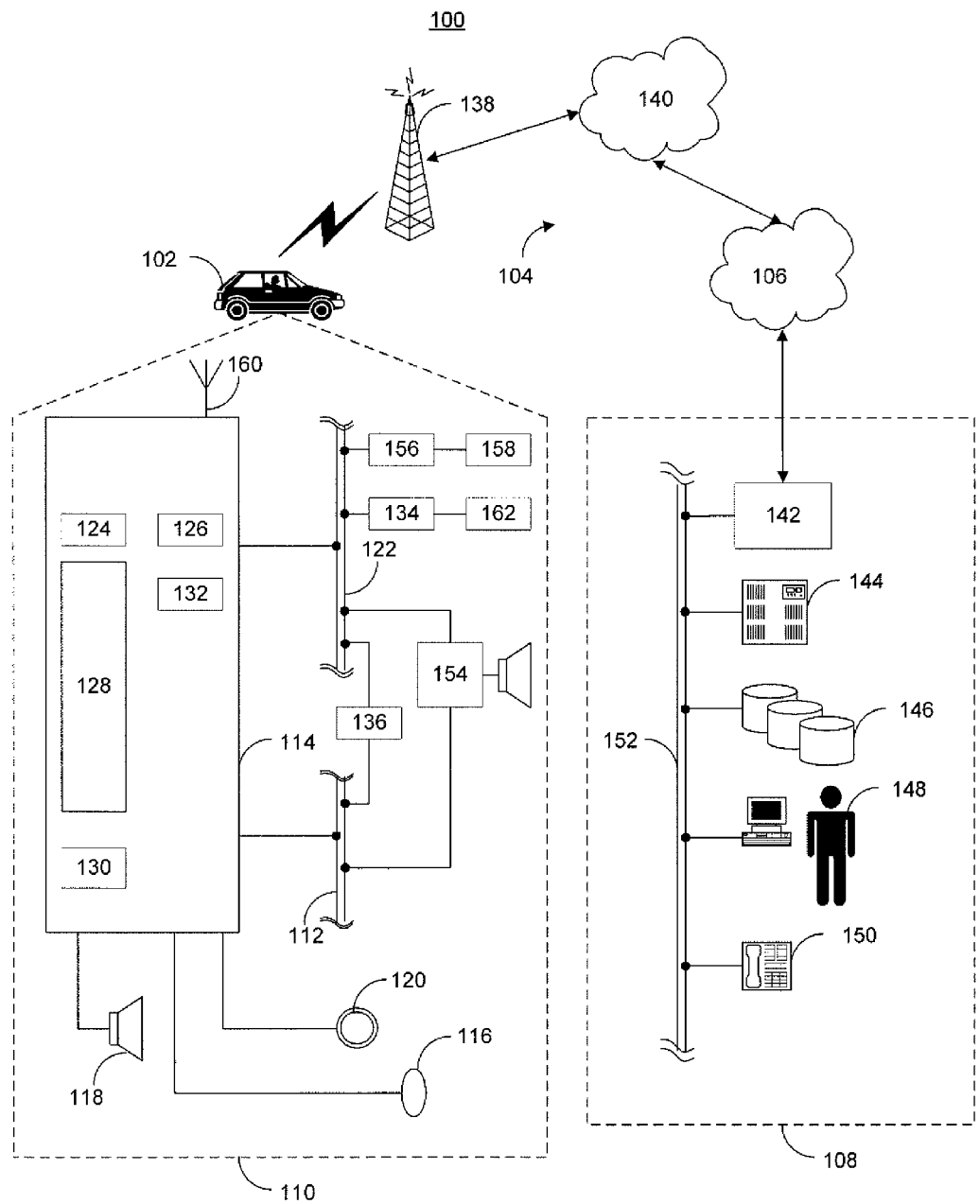
FIG. 1 is a schematic diagram of a communication system within which the described principles may be implemented.

With reference to FIG. 1 there is shown an example of a communication system 100 that may be used with the present system and method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method or form part of the present system as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122.

Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
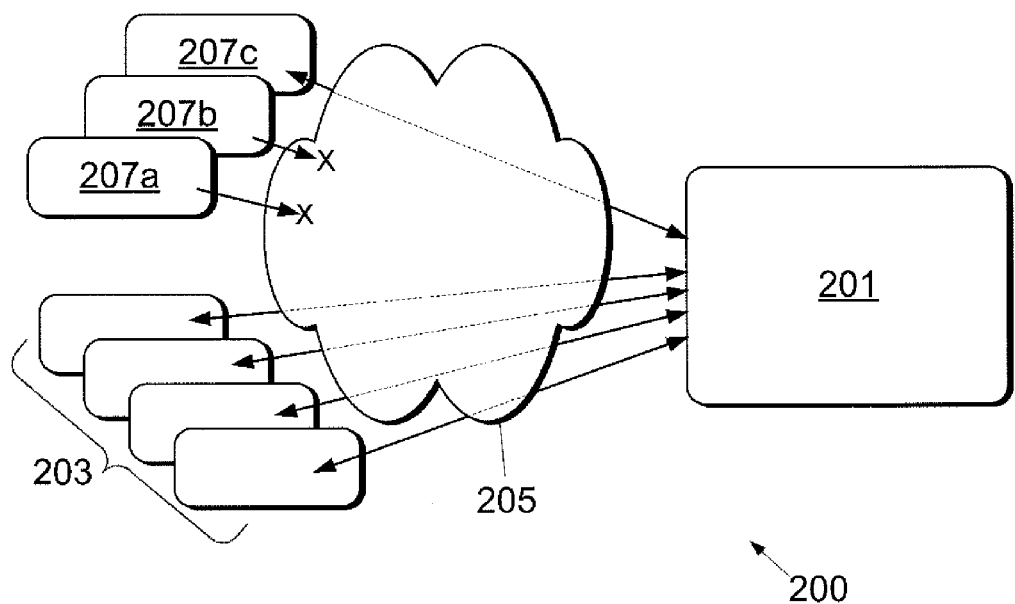
FIG. 2 is a schematic diagram of a network environment in accordance with the described principles including a TSP call center, activated telematics units, deactivated telematics units, and wireless network.

Within this context, the described system and method operate to enhance the service provider's ability to connect with and control a deactivated telematics unit for shutdown, reactivation, data retrieval, etc. The schematic network diagram of FIG. 2 shows a network environment 200 wherein a TSP call center 201 is in contact with activated telematics units 203 via a wireless network 205, e.g., made available by a wireless provider entity. Deactivated telematics units 207a and 207b are not in communication with the telematics service provider 201. However, deactivated telematics unit 207c is put into communication with the telematics service provider 201 after being paged in accordance with the process for establishing a data call connection as described more particularly hereinafter. The deactivated telematics unit 207c may or may not then be reactivated by the telematics service provider 201.

Figure 3:
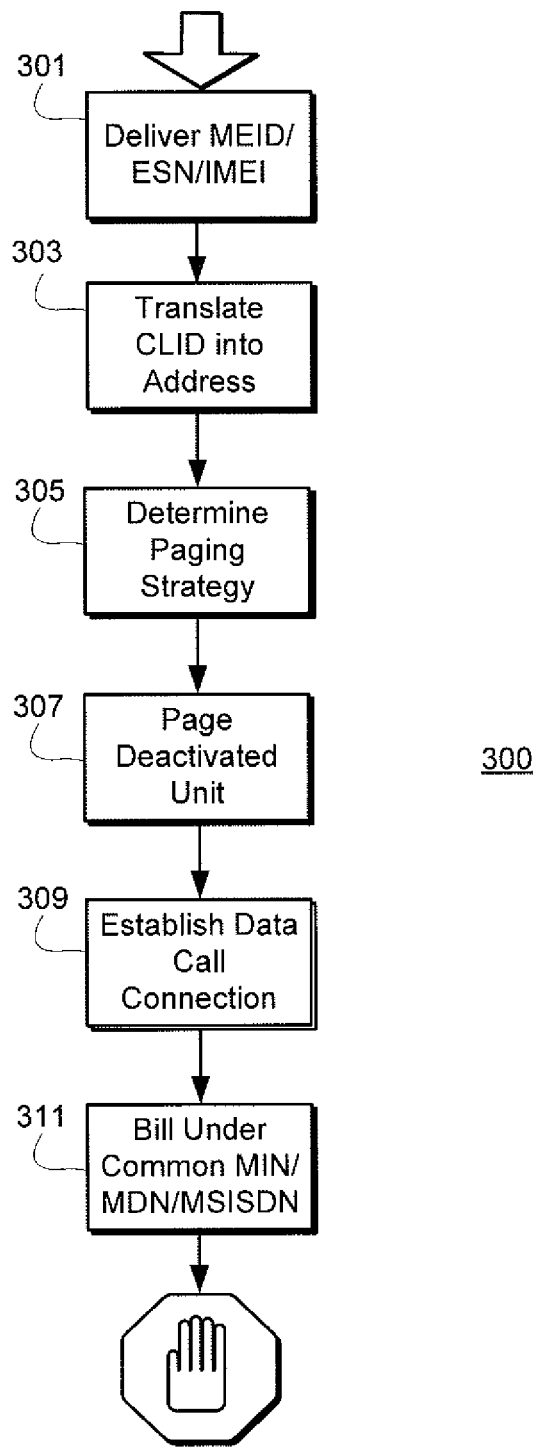
FIG. 3 is a flow chart illustrating a process of establishing a data call connection with a deactivated telematics unit by a telematics service provider in accordance with the described principles.

Given the context of FIGS. 1 and 2, an implementation of the process 300 for establishing a data call connection is depicted by FIG. 3. Individual telematics units are associated with unique identifiers, which may be in MEID, ESN or IMEI format. The TSP may maintain records at a call center of the MEIDs, ESNs and IMEIs associated with active and inactive or deactivated telematics units. Deactivated telematics unit may have no subscriber profile associated with them and multiple deactivated telematics units may be assigned a common MIN, MDN or MSISDN, IMSI to conserve resources. Common MIN, MDN or MSISDN, IMSI can be assigned by MSC-wide area, a NID-wide area or a SID-wide area, or a Regional Global, a Carrier Global, or a Multiple Carrier Global (country-wide) in E164 or E.212 or E.214 format. The common MIN, MDN or MSISDN, IMSI is mapped to GTT.

In order to provide for the provisioning of such deactivated telematics or connect with them for other purposes, the TSP call center may deliver the MEID, ESN or IMEI of a target deactivated telematics unit that it wants to establish a data call connection with to a wireless network service provider 301. The delivery of the MEID, ESN or IMEI of the target deactivated telematics unit may be part of a data call request or a paging request sent to the network. In a further implementation, the TSP call center may deliver the MEID, ESN or IMEI to a cellular gateway or toll exchange of the wireless network ISUP utilizing a SS7 over IP or Softswitch signaling protocol, or SIP over IP or ENUM protocols. One skilled in the art will appreciate that different appropriate protocols may be used depending on how the wireless network is configured, and the potential protocols that may be utilized are not limited to those described herein. It will further be appreciated that the MEID, ESN or IMEI of multiple telematics units that the TSP call center wishes to connect with may be delivered together.

Figure 5:
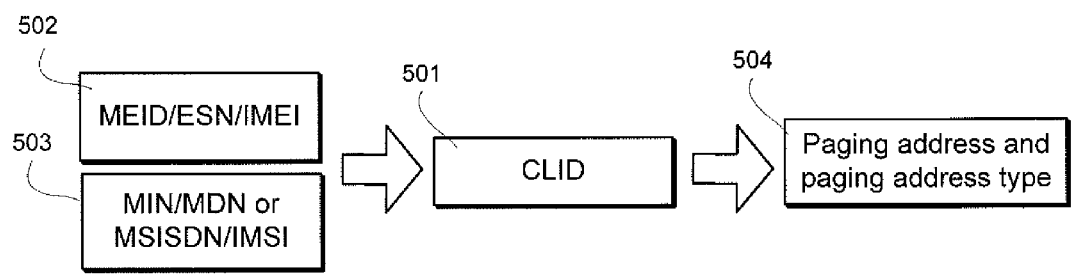
FIG. 5 is a sequence diagram illustrating a CLID processing sequence according to an aspect of the invention.

A CLID based on the MEID, ESN or IMEI and the MIN, MDN or MSISDN, IMSI associated with the deactivated telematics unit may then be translated into a paging address and a paging address type 303. The CUD may further indicate the status of the deactivated telematics unit as deactivated, rather than including subscriber information. In a further implementation, the CLID may be translated into a paging address utilizing GTT and a paging address type utilizing IS41-MAP or GSM-MAP protocols. One skilled in the art will appreciate that the types of routing protocols utilized may be based on the type of network provided by the wireless network provider and appropriate routing protocols may not be limited to those described herein. FIG. 5, discussed below, illustrates a CLID processing sequence according to an aspect of the invention.

After the paging address and paging address type are determined, a paging strategy corresponding to the network topology may be determined 305, and the deactivated telematics unit may be paged according to that paging strategy 307. Different paging strategies may be implemented such as paging a MSC-wide area, a NID-wide area or a SID-wide area, or paging according to a Regional Global strategy, a Carrier Global strategy, or a Multiple Carrier Global strategy. One skilled in the art will appreciate that different types of networks have different topologies, and an appropriate paging strategy may be selected based on the topology.

After being paged according to the appropriate paging strategy, a data call connection may be established between the TSP call center and the deactivated telematics unit 309. The deactivated telematics unit may be provisioned or other functions may be performed via the data call connection.

In yet another further implementation, the wireless network provider may bill the TSP 311 based on the common MIN, MDN or MSISDN, IMSI associated with the deactivated telematics units, such that services provided by the wireless network provider relating to deactivated telematics units may be consolidated.

Figure 4:
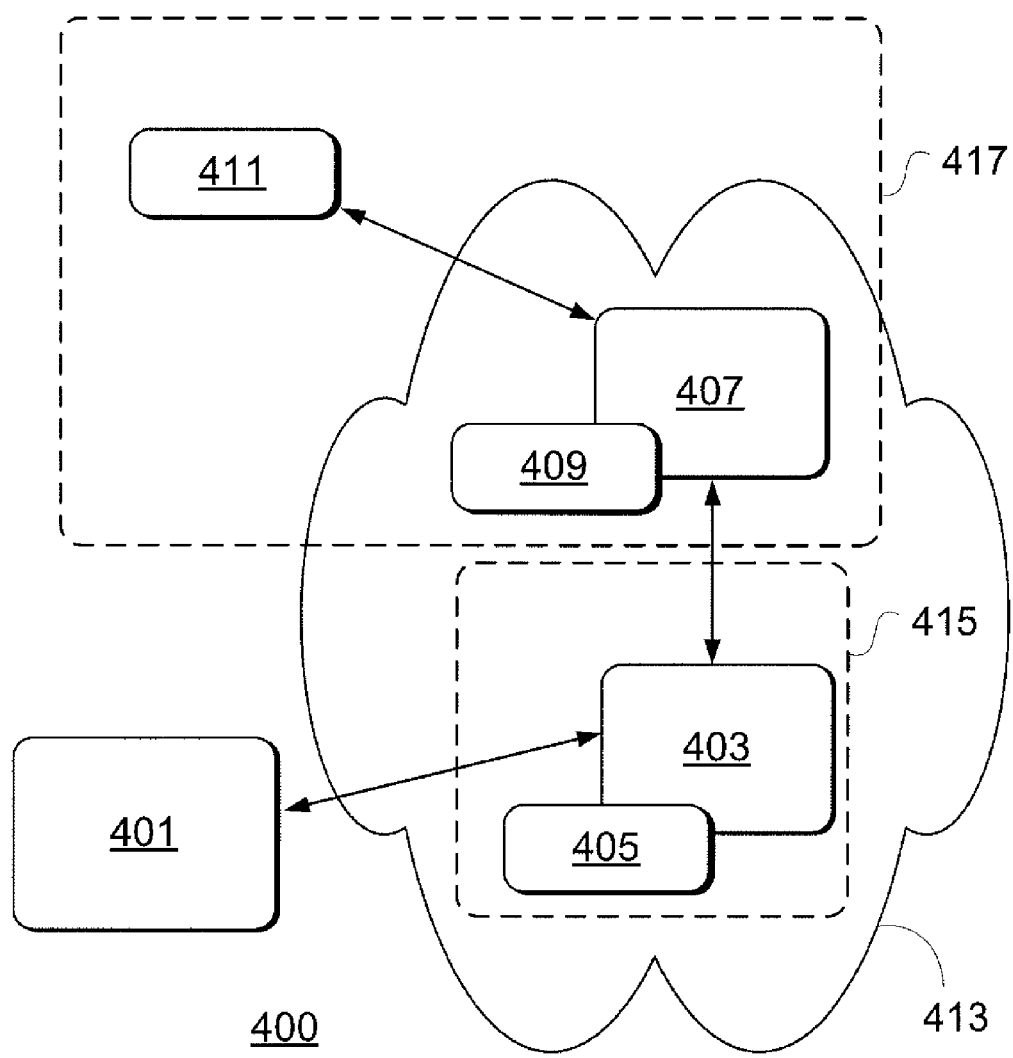
FIG. 4 is a schematic diagram of a network environment in the context of a GSM (Global System for Mobile Communications) network in accordance with the described principles.

Given the context of FIGS. 1 and 2 and the process of FIG. 3, an environment 400 for one implementation of establishing a data call connection with a deactivated telematics unit in a GSM network is depicted in FIG. 4. The deactivated telematics unit 411 may update the wireless network 413 by sending location information to the wireless network 413 regarding the location of the deactivated telematics unit 411. In this example, the deactivated telematics unit 411 is located within the area 417 served by MSC 407, and the location information is temporarily stored in VLR 409 while the deactivated telematics unit is located within the area 417. The location of the deactivated telematics unit 411 may further be sent to the MSC 403 where the HLR 405 is located, and the location of the deactivated telematics unit 411 may further be updated in the HLR 405. The MSC serving the visited area 417 and the MSC serving the home area 415 are a part of the wireless network system 413.

In a further implementation, deactivated telematics units may only update at prescribed times to reduce the use of network resources. The HLR and VLR, while not maintaining a subscriber profile, may include the MEID, ESN or IMEI of one or more deactivated telematics units and report the regional location of the deactivated telematics units based on the location updates.

When a TSP call center 401 wishes to establish a data call connection with the deactivated telematics unit 411, the TSP call center 401 may deliver the MEID, ESN or IMEI of the deactivated telematics unit 411 to the wireless network provider. The MEID, ESN or IMEI, along with the common MIN, MDN or MSISDN, IMSI may then be translated into a paging address and paging address type utilizing GTT and GSM-MAP protocols. The MSC serving the home area 403 and the MSC serving the visited area 407 may then route the paging of the deactivated telematics unit 411 through an appropriate paging strategy, such as paging an MSC-wide area, i.e., paging the area 417 served by MSC 407. In a further implementation, other paging strategies may be used, and if one paging strategy is unsuccessful in locating the telematics unit and establishing a call connection, a wider paging strategy may be used, such as an SID-wide paging strategy.

The deactivated telematics unit 411 may then respond to the page, and a data call connection between the deactivated telematics unit 411 and the TSP call center 401 may thereby be established. The deactivated telematics unit 411 may be provisioned or perform other functions pursuant to the data received over the data call connection.

As noted above, FIG. 5 is a sequence diagram illustrating a CLID processing sequence according to an aspect of the invention. A CLID 501 based on the MEID, ESN or IMEI 502 and the MIN, MDN or MSISDN, IMSI 503 associated with the deactivated telematics unit may then be translated into a paging address and a paging address type 504 at stage 303. The CLID may further indicate the status of the deactivated telematics unit as deactivated, rather than including subscriber information. As noted above, the CLID may be translated into a paging address utilizing GTT and a paging address type utilizing IS41-MAP or GSM-MAP protocols. One skilled in the art will appreciate that the types of routing protocols utilized may be based on the type of network provided by the wireless network provider and appropriate routing protocols may not be limited to those described herein.

From this description, it will be appreciated that the disclosed principles provide a system and method for establishing a data call connection from a TSP call center to a deactivated telematics unit. It will also be appreciated, however, that the described systems, methods and implementations are merely examples of the inventive principles, and that these illustrate only preferred techniques. It is contemplated that other implementations of the invention may differ in detail from the foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for establishing a data call connection between a call center of a telematics service provider (TSP) and a deactivated telematics unit over a wireless network, the method comprising:
    receiving, by a processor of the wireless network from the call center of the TSP, an equipment identifier originally defined by a component of the deactivated telematics unit to uniquely identify the component of the deactivated telematics unit;

generating, by the processor of the wireless network based on the equipment identifier originally defined by the component of the deactivated telematics unit, a paging address for the deactivated telematics unit;

multicasting, by a node of the wireless network to a plurality of terminals to which the paging address is associated, a data call request;

receiving, at the node of the wireless network from the deactivated telematics unit, a data call request received confirmation; and connecting a data call between the call center of the TSP and the deactivated telematics unit based on the data call request received confirmation.

2. The method according to claim 1, wherein the equipment identifier originally defined by the component of the deactivated telematics unit is one of the group consisting of: a mobile equipment identity (MEID), an electronic serial number (ESN), and an international mobile subscriber identity (MSI).

3. The method according to claim 2, further comprising identifying an association between the equipment identifier originally defined by the component of the deactivated telematics unit and a common number defined by the wireless network, wherein the common number defined by the wireless network is associated with multiple telematics units by the wireless network, and wherein the common number is one of the group consisting of: a common MIN (Mobile ID Number), a common MDN (Mobile Directory Number), and a common MSISDN Mobile Subscriber Integrated Services Digital Network Number.

4. The method according to claim 3, further comprising generating a CLID (Calling Line ID) that includes the equipment identifier originally defined by the component of the deactivated telematics unit and the common number defined by the wireless network.

5. The method according to claim 4, wherein generating the paging address for the deactivated telematics unit includes translating the CLID via at least one of the group consisting of: GTT (Global Title Translation) protocol, IS41-MAP (US Telecoms Industry Association Interim Standard 41 Mobile Application Part) protocol, and GSM-MAP (Global System for Mobile Communications Mobile Application Part) protocols.

6. The method according to claim 1, wherein the equipment identifier originally defined by the component of the deactivated telematics unit is received via at least one of the group consisting of: SS7 (Signaling System Number 7) over IP (Internet Protocol), Softswitch protocol, SIP (Session Initiation Protocol) over IP, and ENUM (E.164 Number Mapping) protocols.

7. The method according to claim 1, wherein multicasting, by a node of the wireless network to a plurality of terminals to which the paging address is associated a data call request is performed in accordance with a paging strategy based on a topography of the network.

8. The method according to claim 7, wherein the paging strategy includes at least one of the group consisting of: paging a MSC-wide (Mobile Switching Center) area, paging a NID-wide (Network Identifier) area, paging a SID-wide (System Identifier) area, executing a Regional Global paging strategy, executing a Carrier Global paging strategy, and executing a Multiple Carrier Global paging strategy.

9. The method according to claim 3, further comprising billing the data call according to a billing process corresponding to the common number defined by the wireless network.

10. The method according to claim 1, further comprising:
receiving information from the deactivated telematics unit during the data call; and
activating the deactivated telematics unit according to the information received during the data call.

11. A method, executed by a deactivated telematics unit, for establishing a data call connection with a call center of a telematics service provider (TSP) over a wireless network, the method comprising:

receiving, by the deactivated telematics unit from the wireless network, a data call request notifying the deactivated telematics unit of an attempt by the call center of the TSP to establish a data call connection with the deactivated telematics unit, wherein the data call request is multicasted by a node of the wireless network to a plurality of terminals associated with a paging address generated according to an equipment identifier originally defined by a component of the deactivated telematics unit to identify the component of the deactivated telematics unit;

transmitting, by the deactivated telematics unit, a data call request received confirmation to the node of the wireless network; and communicating, by the deactivated telematics unit, with the call center of the TSP via a data call connection.

12. The method according to claim 11, wherein the location of the deactivated telematics unit is updated at the wireless network based on the information relating to the location of the deactivated telematics unit sent by the deactivated telematics unit, wherein the update is executed on at least one of a HLR (Home Location Register) and a VLR (Visitor Location Register).

13. The method according to claim 11, wherein the data call request received by the deactivated telematics unit is sent by the wireless network according to a paging strategy based on a topography of the network.

14. The method according to claim 13, wherein the paging strategy includes one of: paging a MSC-wide (Mobile Switching Center) area, paging a NID-wide (Network Identifier) area, paging a SID-wide (System Identifier) area, executing a Regional Global paging strategy, executing a Carrier Global paging strategy, and executing a Multiple Carrier Global paging strategy.

15. The method according to claim 11, wherein the paging address is generated based on a common number assigned by the wireless network and an equipment identifier originally defined by a component of the deactivated telematics unit to identify the component of the deactivated telematics unit.

16. The method according to claim 15, wherein the equipment identifier is one of a mobile equipment identity (MEID), an electronic serial number (ESN) or an international mobile subscriber identifier (IMSI), and
wherein the common number is one of a common MIN (Mobile ID Number), a common MDN (Mobile Directory Number), or a common mobile subscriber integrated services digital network-number (MSISDN).

17. A system for establishing a data call connection between a telematics service provider (TSP) call center and a deactivated telematics unit over a wireless network, the system comprising:

the TSP call center, adapted to send a data call connection request to the wireless network and to communicate with the deactivated telematics unit via the data call connection, wherein the data call connection request includes an equipment identifier defined by a component of the deactivated telematics unit to uniquely identify the component of the deactivated telematics unit;

the deactivated telematics unit, adapted to receive a data call request from the wireless network and to transmit a data call request received confirmation to the wireless network; and the wireless network, adapted to:
- receive, from the TSP call center, the data call connection request that includes the equipment identifier defined by a component of the deactivated telematics unit,
- determine, from the equipment identifier originally defined by the component of the deactivated telematics unit, a paging address associated with the deactivated telematics unit,
- multicast, to a plurality of terminals to which the paging address is associated, a data call request,
- receive at the node of the wireless network from the deactivated telematics unit, a data call request received confirmation, and
- connect a data call between the TSP call center and the deactivated telematics unit.

18. The method of claim 17, wherein the wireless network is further adapted to determine, based on a topography of the wireless network, a paging strategy by which to multicast the data call request.

19. The method of claim 17, wherein the wireless network includes a mobile switching center (MSC), a home location register (HLR), and a visitor location register (VLR), wherein the HLR and the VLR are associated with the MSC.

20. The method of claim 18, wherein the wireless network is further adapted to store an association between the equipment identifier defined by the component of the deactivated telematics unit and a common number defined by the wireless network; and wherein the paging address is determined based on the equipment identifier defined by the component of the deactivated telematics unit and the common number defined by the wireless network.

* * * * *